United States Patent
Kim et al.

(10) Patent No.: US 11,291,936 B2
(45) Date of Patent: Apr. 5, 2022

(54) STRAINER FOR FUEL PUMP

(71) Applicant: COAVIS, Sejong-si (KR)

(72) Inventors: Joon Seup Kim, Daejeon (KR); Yong Hwan Choi, Daejeon (KR); Ku Sung Kwon, Daejeon (KR); Jong Hyuk Yoon, Sejong-si (KR); Jin Kyu Choi, Cheongju-si (KR); Jeong Sik Kim, Daejeon (KR); Dong Heon Mo, Sejong-si (KR)

(73) Assignee: COAVIS, Sejong-si (KR)

( * ) Notice: Subject to any disclaimer, the term of this patent is extended or adjusted under 35 U.S.C. 154(b) by 30 days.

(21) Appl. No.: 17/022,160

(22) Filed: Sep. 16, 2020

(65) Prior Publication Data
US 2021/0086114 A1    Mar. 25, 2021

(30) Foreign Application Priority Data
Sep. 25, 2019 (KR) .................. 10-2019-0118086

(51) Int. Cl.
*B01D 35/26* (2006.01)
*B01D 35/00* (2006.01)
*F02M 37/50* (2019.01)

(52) U.S. Cl.
CPC .......... *B01D 35/26* (2013.01); *B01D 35/005* (2013.01); *F02M 37/50* (2019.01)

(58) Field of Classification Search
None
See application file for complete search history.

(56) References Cited

U.S. PATENT DOCUMENTS

| 1,058,133 | A | * | 4/1913 | Yourtree | B01D 36/001 |
| | | | | | 210/313 |
| 1,394,011 | A | * | 10/1921 | Hills | B60K 15/00 |
| | | | | | 210/172.4 |
| 1,568,796 | A | * | 1/1926 | Breer | F04B 53/1037 |
| | | | | | 210/130 |
| 1,677,118 | A | * | 7/1928 | Ford | B01D 29/23 |
| | | | | | 210/457 |
| 1,773,134 | A | * | 8/1930 | Fisher | F04B 53/1037 |
| | | | | | 210/167.02 |

(Continued)

FOREIGN PATENT DOCUMENTS

KR            101075796 B1    10/2011

*Primary Examiner* — Robert J Popovics
(74) *Attorney, Agent, or Firm* — Nixon Peabody LLP; Thomas P. Pavelko (57) ABSTRACT

A strainer for a fuel pump according to the present invention includes: a communicating pipe including a flow path formed to communicate with a fuel inlet of the fuel pump; a filter including an internal space in which a fuel flows and coupled to the communicating pipe so that the internal space communicates with the communicating pipe; and a rib disposed in the filter and coupled to the communicating pipe, in which the filter includes a first filtering portion extending in a length direction with respect to the communicating pipe, a connecting portion extending in a width direction at an edge of the first filtering portion, and a second filtering portion extending in the length direction at the connecting portion and spaced apart from the first filtering portion in the width direction. Therefore, the strainer may have a relatively large filtering area and a small size.

13 Claims, 11 Drawing Sheets

(56) References Cited

U.S. PATENT DOCUMENTS

| | | | | |
|---|---|---|---|---|
| 2,424,211 A * | 7/1947 | Webb | B01D 35/0273 | 210/461 |
| 2,788,125 A * | 4/1957 | Webb | B01D 35/0273 | 210/172.4 |
| 2,937,755 A * | 5/1960 | Szwargulski | B01D 39/083 | 210/172.3 |
| 3,023,905 A * | 3/1962 | McDougal | F04B 53/1037 | 210/172.4 |
| 3,108,065 A * | 10/1963 | McMichael | F02M 37/50 | 210/172.3 |
| 3,294,025 A * | 12/1966 | Niemeyer | F04D 13/086 | 210/416.4 |
| 3,763,840 A * | 10/1973 | Schimmelpfenig | F02M 37/0082 | 137/469 |
| 3,826,372 A * | 7/1974 | Bell | F02M 37/50 | 210/172.4 |
| 3,875,059 A * | 4/1975 | Maschino | B01D 35/26 | 210/172.3 |
| 3,900,397 A * | 8/1975 | Bell | B01D 35/0273 | 210/128 |
| 3,910,464 A * | 10/1975 | Schlanzky | F04D 29/605 | 222/180 |
| 4,250,039 A * | 2/1981 | Cozzi | B01D 29/111 | 210/416.5 |
| 4,303,513 A * | 12/1981 | Lundquist | B01D 35/027 | 210/132 |
| 4,304,664 A * | 12/1981 | McAlindon | B01D 17/10 | 210/172.3 |
| 4,312,753 A * | 1/1982 | Bell | B01D 35/0273 | 210/250 |
| 4,358,372 A * | 11/1982 | Lundquist | B01D 35/0273 | 210/172.6 |
| 4,420,396 A * | 12/1983 | Yamamoto | B01D 29/15 | 210/416.4 |
| 4,546,750 A * | 10/1985 | Brunell | B60K 15/077 | 123/514 |
| 4,569,637 A * | 2/1986 | Tuckey | F02M 37/08 | 417/360 |
| 4,617,121 A * | 10/1986 | Yokoyama | B01D 29/15 | 210/416.4 |
| 4,618,422 A * | 10/1986 | Sasaki | B01D 29/15 | 210/172.3 |
| 4,743,370 A * | 5/1988 | Mizusawa | B01D 29/111 | 210/460 |
| 4,783,260 A * | 11/1988 | Kurihara | B01D 29/15 | 210/232 |
| 4,790,185 A * | 12/1988 | Fedelem | G01F 23/30 | 137/565.24 |
| 4,804,466 A * | 2/1989 | Cooper | B01D 29/15 | 210/316 |
| 4,851,118 A * | 7/1989 | Kurihara | B01D 35/26 | 210/315 |
| 4,853,123 A * | 8/1989 | Hayes | B01D 29/111 | 210/316 |
| 4,874,510 A * | 10/1989 | Akira | B01D 29/15 | 210/172.4 |
| 4,961,850 A * | 10/1990 | Combest | B01D 29/012 | 210/232 |
| 4,966,522 A * | 10/1990 | Koyama | F02M 37/50 | 415/121.2 |
| 5,049,267 A * | 9/1991 | Sasaki | B01D 35/0273 | 210/172.3 |
| 5,049,271 A * | 9/1991 | Cain | F02M 37/50 | 210/250 |
| 5,055,187 A * | 10/1991 | Ito | B01D 29/15 | 210/172.4 |
| 5,111,844 A * | 5/1992 | Emmert | F02M 37/106 | 123/514 |
| 5,120,434 A * | 6/1992 | Yoshida | B01D 29/15 | 210/172.4 |
| 5,146,901 A * | 9/1992 | Jones | F02M 25/0854 | 123/509 |
| 5,169,531 A * | 12/1992 | Shiraga | B01D 29/114 | 210/460 |
| 5,174,841 A * | 12/1992 | Combest | B01D 29/012 | 156/73.1 |
| 5,186,152 A * | 2/1993 | Cortochiato | F02M 37/44 | 123/514 |
| 5,263,458 A * | 11/1993 | Fujino | F02B 37/105 | 123/514 |
| 5,341,842 A * | 8/1994 | Chih | F02M 37/025 | 123/514 |
| 5,375,629 A * | 12/1994 | Wilson | D03D 15/00 | 139/383 R |
| 5,395,520 A * | 3/1995 | Ito | B01D 29/15 | 210/172.4 |
| 5,398,659 A * | 3/1995 | Zimmerman | F02M 37/106 | 123/514 |
| 5,409,608 A * | 4/1995 | Yoshida | F02M 37/50 | 210/315 |
| 5,415,146 A * | 5/1995 | Tuckey | B01D 35/0273 | 123/509 |
| 5,431,143 A * | 7/1995 | Brown | B60K 15/077 | 123/514 |
| 5,511,957 A * | 4/1996 | Tuckey | B01D 35/0273 | 417/313 |
| 5,547,568 A * | 8/1996 | Sasaki | B01D 29/15 | 210/172.4 |
| 5,582,729 A * | 12/1996 | Shioda | B01D 35/0273 | 210/461 |
| 5,584,988 A * | 12/1996 | Hashimoto | B01D 29/15 | 210/136 |
| 5,607,578 A * | 3/1997 | Ohkouchi | B01D 35/027 | 210/172.4 |
| 5,613,476 A * | 3/1997 | Oi | B01D 35/0273 | 123/509 |
| 5,639,367 A * | 6/1997 | Ohzeki | F02M 37/10 | 210/315 |
| 5,647,329 A * | 7/1997 | Bucci | B01D 35/0273 | 123/509 |
| 5,649,514 A * | 7/1997 | Okada | F02M 37/50 | 123/514 |
| 5,665,229 A * | 9/1997 | Fitzpatrick | B01D 35/027 | 210/232 |
| 5,702,237 A * | 12/1997 | Hill | B01D 29/114 | 417/313 |
| 5,716,522 A * | 2/1998 | Chilton | B01D 29/111 | 210/317 |
| 5,728,292 A * | 3/1998 | Hashimoto | B01D 29/15 | 210/136 |
| 5,776,341 A * | 7/1998 | Barnard | B01D 35/027 | 210/306 |
| 5,778,926 A * | 7/1998 | Tanaka | F02M 37/42 | 137/508 |
| 5,782,223 A * | 7/1998 | Yamashita | C08G 18/161 | 123/510 |
| 5,785,032 A * | 7/1998 | Yamashita | B01D 35/0273 | 123/509 |
| 5,787,865 A * | 8/1998 | Harris | B01D 35/0273 | 123/516 |
| 5,795,468 A * | 8/1998 | Reising | B01D 29/15 | 210/172.4 |
| 5,809,975 A * | 9/1998 | Tuckey | B01D 35/0273 | 123/509 |
| 5,900,140 A * | 5/1999 | Nagai | B01D 35/027 | 210/85 |
| 5,900,148 A * | 5/1999 | Izutani | F02M 37/44 | 210/416.4 |
| 5,902,480 A * | 5/1999 | Chilton | F02M 37/50 | 210/317 |
| 5,928,507 A * | 7/1999 | Chiga | B01D 35/26 | 210/172.4 |
| 6,098,600 A * | 8/2000 | Umetsu | F02M 37/106 | 123/514 |
| 6,109,299 A * | 8/2000 | Hashimoto | B60K 15/077 | 123/514 |

(56) References Cited

U.S. PATENT DOCUMENTS

| | | | | |
|---|---|---|---|---|
| 6,123,511 A * | 9/2000 | Sertier | B60K 15/077 | 123/509 |
| 6,123,521 A * | 9/2000 | Mori | F02M 37/50 | 417/423.3 |
| 6,156,201 A * | 12/2000 | Ueda | F02M 37/44 | 210/416.4 |
| 6,176,260 B1 * | 1/2001 | Hahner | B60K 15/077 | 123/468 |
| 6,220,454 B1 * | 4/2001 | Chilton | B01D 29/15 | 210/483 |
| 6,241,883 B1 * | 6/2001 | Noda | B01D 35/027 | 210/172.3 |
| 6,260,542 B1 * | 7/2001 | Kochsmeier | F02M 37/103 | 123/509 |
| 6,283,731 B1 * | 9/2001 | Yoshioka | B01D 35/0273 | 417/423.3 |
| 6,293,770 B1 * | 9/2001 | Matsumoto | F02M 37/106 | 417/361 |
| 6,308,733 B2 * | 10/2001 | Murakoshi | B60K 15/077 | 123/509 |
| 6,343,589 B1 * | 2/2002 | Talaski | F02M 37/025 | 123/509 |
| 6,361,691 B1 * | 3/2002 | Dockery | B01D 35/027 | 210/242.1 |
| 6,378,504 B1 * | 4/2002 | Horiuchi | B01D 35/26 | 123/509 |
| 6,382,190 B1 * | 5/2002 | Tanabe | B01D 29/071 | 123/509 |
| 6,412,517 B1 * | 7/2002 | Flambert | B01D 35/0273 | 137/550 |
| 6,451,205 B1 * | 9/2002 | McGaw, Jr. | B29C 65/08 | 156/73.3 |
| 6,464,872 B1 * | 10/2002 | Honda | B01D 35/0273 | 210/416.4 |
| 6,471,072 B1 * | 10/2002 | Rickie | F02M 37/50 | 210/486 |
| 6,471,863 B2 * | 10/2002 | Kojima | B01D 35/0273 | 210/416.4 |
| 6,551,509 B2 * | 4/2003 | Appleton | F02M 37/10 | 210/416.4 |
| 6,575,309 B1 * | 6/2003 | Chiga | B01D 29/05 | 210/435 |
| 6,582,599 B2 * | 6/2003 | Ito | F02M 37/50 | 210/416.1 |
| 6,613,227 B2 * | 9/2003 | Rickie | B01D 35/0273 | 210/243 |
| 6,638,423 B2 * | 10/2003 | Dockery | B01D 35/0273 | 210/132 |
| 6,736,273 B2 * | 5/2004 | Chiga | B01D 35/027 | 210/461 |
| 6,739,354 B2 * | 5/2004 | Oku | B01D 35/0273 | 137/565.22 |
| 6,743,355 B2 * | 6/2004 | Roth | B01D 35/0273 | 210/175 |
| 6,821,422 B1 * | 11/2004 | Brzozowski | F02M 37/50 | 210/416.4 |
| 6,830,687 B2 * | 12/2004 | Dockery | B01D 35/0273 | 210/416.4 |
| 6,833,070 B2 * | 12/2004 | Fischer | B01D 35/0273 | 210/232 |
| 6,863,814 B2 * | 3/2005 | Okabe | B01D 35/027 | 210/416.4 |
| 6,913,693 B2 * | 7/2005 | Unuki | F02M 37/50 | 210/416.4 |
| 6,936,168 B2 * | 8/2005 | Dockery | B01D 35/0273 | 210/416.4 |
| 6,951,208 B2 * | 10/2005 | Milton | F02M 37/106 | 123/509 |
| 6,964,265 B2 * | 11/2005 | Iwamoto | B01D 35/26 | 123/510 |
| 6,998,043 B2 * | 2/2006 | Fischer | B01D 35/0273 | 210/232 |
| 7,007,677 B2 * | 3/2006 | Toki | B01D 35/0273 | 123/509 |
| 7,029,582 B2 * | 4/2006 | Sato | F02M 37/42 | 210/232 |
| 7,077,109 B2 * | 7/2006 | Lee | F02M 37/0029 | 123/514 |
| 7,083,722 B2 * | 8/2006 | McGaw, Jr. | B29C 65/08 | 210/167.02 |
| 7,112,278 B2 * | 9/2006 | Yamada | B01D 35/0273 | 210/232 |
| 7,117,854 B2 * | 10/2006 | Schmitt | B01D 35/0276 | 123/509 |
| 7,182,869 B2 * | 2/2007 | Catlin | F02M 37/10 | 210/416.4 |
| 7,191,767 B2 * | 3/2007 | Schmitt | F02M 37/44 | 123/509 |
| 7,198,035 B2 * | 4/2007 | Kadler | B60K 15/077 | 123/509 |
| 7,207,320 B2 * | 4/2007 | Ikeya | F02M 37/14 | 123/509 |
| 7,228,848 B1 * | 6/2007 | Rangel | F02M 37/50 | 123/509 |
| 7,279,095 B2 * | 10/2007 | Usui | B01D 35/0273 | 210/232 |
| 7,306,715 B2 * | 12/2007 | Kato | F02M 37/106 | 210/136 |
| 7,387,111 B2 * | 6/2008 | Yu | F02M 37/106 | 123/509 |
| 7,407,057 B2 * | 8/2008 | Vichinsky | B01D 27/005 | 210/437 |
| 7,429,322 B2 * | 9/2008 | Fujita | F02M 37/50 | 210/172.4 |
| 7,478,729 B2 * | 1/2009 | Sato | F02M 37/50 | 210/491 |
| 7,513,243 B2 * | 4/2009 | Nakagawa | B01D 35/027 | 123/509 |
| 7,546,833 B2 * | 6/2009 | Tomomatsu | F02M 37/50 | 123/509 |
| 7,628,143 B2 * | 12/2009 | Yamada | F02M 37/106 | 123/509 |
| 7,857,143 B2 * | 12/2010 | Oku | F02M 37/14 | 210/416.4 |
| 7,901,572 B2 * | 3/2011 | Sato | B01D 39/1623 | 210/172.4 |
| 7,927,400 B2 * | 4/2011 | Graber | B01D 39/1623 | 95/59 |
| 7,964,096 B2 * | 6/2011 | Kimisawa | F02M 37/025 | 210/172.4 |
| 7,976,712 B2 * | 7/2011 | Rocheux | B01D 39/1623 | 210/774 |
| 8,052,868 B2 * | 11/2011 | Sato | F02M 37/24 | 210/172.4 |
| 8,080,086 B2 * | 12/2011 | Graber | B01D 39/1623 | 95/59 |
| 8,137,546 B2 * | 3/2012 | Ogose | B01D 39/1623 | 210/172.4 |
| 8,173,013 B2 * | 5/2012 | Sato | F02M 37/50 | 210/172.4 |
| 8,246,819 B2 * | 8/2012 | Sakata | B29C 65/1635 | 210/167.08 |
| D667,923 S * | 9/2012 | Ueki | D23/209 | |
| 8,372,278 B1 * | 2/2013 | Nguyen | B01D 35/0273 | 210/172.2 |
| 8,453,622 B2 * | 6/2013 | Iwaoka | F02M 37/0017 | 123/509 |
| 8,460,542 B2 * | 6/2013 | Oku | B01D 35/26 | 210/172.4 |
| 8,524,091 B2 * | 9/2013 | Rocheux | F01N 3/2066 | 210/774 |
| 8,715,497 B2 * | 5/2014 | Schnipke | B01D 35/0273 | 210/172.2 |
| 8,728,308 B2 * | 5/2014 | Schnipke | B01D 35/0273 | 210/172.2 |
| 8,936,008 B2 * | 1/2015 | Powell | F02M 37/50 | 123/495 |
| 9,080,537 B2 * | 7/2015 | Choi | B01D 35/30 | |

(56) References Cited

U.S. PATENT DOCUMENTS

| | | | | |
|---|---|---|---|---|
| 9,132,366 B2* | 9/2015 | Ueki | | F02M 37/44 |
| 9,151,257 B2* | 10/2015 | Jeon | | F02M 37/103 |
| 9,194,343 B2* | 11/2015 | Thienel | | F02M 37/24 |
| 9,248,390 B2* | 2/2016 | Hudgens | | F01N 3/2066 |
| 9,421,483 B2* | 8/2016 | Goll | | B01D 35/005 |
| 9,441,586 B2* | 9/2016 | Akagi | | B01D 35/0273 |
| 9,470,193 B2* | 10/2016 | Ries | | B01D 35/0276 |
| 9,486,725 B2* | 11/2016 | Ries | | B01D 29/117 |
| 9,555,353 B2* | 1/2017 | Graber | | B01D 39/083 |
| 9,567,955 B2* | 2/2017 | Akagi | | F02M 37/50 |
| 9,816,470 B2* | 11/2017 | Nishio | | F02M 37/10 |
| 9,937,448 B2* | 4/2018 | Yost | | B29C 51/082 |
| 9,957,931 B2* | 5/2018 | Kobayashi | | B01D 35/26 |
| 9,962,636 B2* | 5/2018 | Hibi | | B01D 35/0273 |
| 10,024,283 B2* | 7/2018 | Ishitoya | | B01D 35/0273 |
| 10,029,561 B2* | 7/2018 | Tipton | | B60K 15/077 |
| 10,145,341 B2* | 12/2018 | Kim | | F02M 37/14 |
| 10,190,554 B2* | 1/2019 | Ishimitsu | | B01D 61/362 |
| 10,267,276 B2* | 4/2019 | Nishio | | F02M 37/50 |
| 10,328,366 B2* | 6/2019 | Hudgens | | B01D 29/902 |
| 10,391,860 B2* | 8/2019 | Tipton | | F02M 37/0011 |
| 10,436,161 B2* | 10/2019 | Kim | | F02M 37/14 |
| 10,463,999 B2* | 11/2019 | Washington | | B01D 35/005 |
| 10,590,894 B2* | 3/2020 | Hayashi | | B01D 29/31 |
| 10,744,428 B2* | 8/2020 | Wyhler | | B01D 35/18 |
| 10,753,329 B2* | 8/2020 | Hayashi | | B01D 29/13 |
| 10,794,343 B2* | 10/2020 | Hayashi | | F02M 37/106 |
| 11,014,446 B2* | 5/2021 | Tipton | | B60K 15/077 |
| 11,073,118 B2* | 7/2021 | Ito | | F04C 13/008 |
| 11,168,655 B2* | 11/2021 | Niwa | | B01D 36/005 |
| 2002/0017485 A1* | 2/2002 | Ito | | F02M 37/34 |
| | | | | 210/416.4 |
| 2002/0023418 A1* | 2/2002 | Kojima | | B01D 35/0273 |
| | | | | 55/379 |
| 2002/0100717 A1* | 8/2002 | Ueda | | B01D 35/0273 |
| | | | | 210/116 |
| 2002/0121473 A1* | 9/2002 | Boast | | B01D 35/0273 |
| | | | | 210/450 |
| 2002/0153300 A1* | 10/2002 | Appleton | | F02M 37/10 |
| | | | | 210/416.4 |
| 2003/0010692 A1* | 1/2003 | Sato | | B01D 35/0273 |
| | | | | 210/172.4 |
| 2003/0042185 A1* | 3/2003 | Dockery | | F02M 37/50 |
| | | | | 210/132 |
| 2003/0080046 A1* | 5/2003 | Ito | | B01D 29/21 |
| | | | | 210/416.4 |
| 2003/0111060 A1* | 6/2003 | Ito | | F02M 37/50 |
| | | | | 123/509 |
| 2003/0132156 A1* | 7/2003 | Rickie | | B01D 35/0273 |
| | | | | 210/416.4 |
| 2004/0000516 A1* | 1/2004 | Okabe | | B01D 35/027 |
| | | | | 210/416.4 |
| 2004/0020839 A1* | 2/2004 | Kato | | B01D 35/26 |
| | | | | 210/232 |
| 2004/0037713 A1* | 2/2004 | Schelhas | | F02M 37/46 |
| | | | | 417/313 |
| 2004/0045884 A1* | 3/2004 | Roth | | B01D 35/18 |
| | | | | 210/184 |
| 2004/0129626 A1* | 7/2004 | Fischer | | B01D 35/0273 |
| | | | | 210/416.4 |
| 2004/0140257 A1* | 7/2004 | Dockery | | F02M 37/50 |
| | | | | 210/416.4 |
| 2004/0144705 A1* | 7/2004 | Yamada | | F02M 37/103 |
| | | | | 210/172.4 |
| 2004/0168971 A1* | 9/2004 | Sato | | B01D 35/0273 |
| | | | | 210/486 |
| 2004/0222143 A1* | 11/2004 | Kojima | | F02M 37/50 |
| | | | | 210/416.4 |
| 2004/0251194 A1* | 12/2004 | Brzozowski | | B01D 35/0273 |
| | | | | 210/416.4 |
| 2005/0006300 A1* | 1/2005 | Sato | | F02M 37/42 |
| | | | | 210/416.4 |
| 2005/0023201 A1* | 2/2005 | Sato | | B01D 35/0273 |
| | | | | 210/172.4 |
| 2005/0029173 A1* | 2/2005 | Kimisawa | | B01D 29/15 |
| | | | | 210/136 |
| 2005/0029180 A1* | 2/2005 | Kimisawa | | B01D 35/027 |
| | | | | 210/172.4 |
| 2005/0061723 A1* | 3/2005 | Matsushita | | B01D 39/18 |
| | | | | 210/171 |
| 2005/0087178 A1* | 4/2005 | Milton | | F02M 37/025 |
| | | | | 123/509 |
| 2005/0087485 A1* | 4/2005 | Takahashi | | F02M 37/106 |
| | | | | 210/232 |
| 2005/0098489 A1* | 5/2005 | Fischer | | F02M 37/50 |
| | | | | 210/172.3 |
| 2005/0115887 A1* | 6/2005 | Dockery | | B01D 35/0273 |
| | | | | 210/416.4 |
| 2005/0150826 A1* | 7/2005 | Sato | | F02M 37/50 |
| | | | | 210/488 |
| 2005/0173329 A1* | 8/2005 | Iwamoto | | B01D 35/26 |
| | | | | 210/232 |
| 2005/0236321 A1* | 10/2005 | Usui | | B01D 35/26 |
| | | | | 210/416.4 |
| 2005/0274361 A1* | 12/2005 | Ikeya | | F02M 37/025 |
| | | | | 123/457 |
| 2005/0286103 A1* | 12/2005 | Yu | | F02M 37/106 |
| | | | | 123/509 |
| 2006/0070941 A1* | 4/2006 | Cline | | B01D 35/0276 |
| | | | | 210/416.4 |
| 2006/0076287 A1* | 4/2006 | Catlin | | F04F 5/10 |
| | | | | 210/416.4 |
| 2006/0138035 A1* | 6/2006 | Izutani | | F02M 37/44 |
| | | | | 210/172.3 |
| 2006/0180535 A1* | 8/2006 | Yu | | F02M 37/50 |
| | | | | 210/172.3 |
| 2006/0266693 A1* | 11/2006 | Yoshida | | F02M 37/44 |
| | | | | 210/335 |
| 2006/0266701 A1* | 11/2006 | Dickerson | | B01D 39/1623 |
| | | | | 210/503 |
| 2007/0095733 A1* | 5/2007 | Pizzo | | B01D 35/0273 |
| | | | | 210/172.4 |
| 2007/0181102 A1* | 8/2007 | Hazama | | F02M 37/50 |
| | | | | 123/514 |
| 2007/0199546 A1* | 8/2007 | Tomomatsu | | F02M 37/106 |
| | | | | 123/509 |
| 2007/0199884 A1* | 8/2007 | Nakagawa | | B01D 35/0273 |
| | | | | 210/416.4 |
| 2007/0215122 A1* | 9/2007 | Nakagawa | | F02M 37/0029 |
| | | | | 123/509 |
| 2007/0246420 A1* | 10/2007 | Sato | | B01D 35/0273 |
| | | | | 210/416.4 |
| 2008/0169033 A1* | 7/2008 | Tipton | | F02M 37/103 |
| | | | | 137/565.24 |
| 2008/0185331 A1* | 8/2008 | Sato | | F02M 37/24 |
| | | | | 210/435 |
| 2008/0245724 A1* | 10/2008 | Oku | | F02M 37/106 |
| | | | | 210/416.4 |
| 2008/0290013 A1* | 11/2008 | Stausberg | | B01D 35/0273 |
| | | | | 210/167.04 |
| 2009/0000844 A1* | 1/2009 | Castillo | | F02M 37/46 |
| | | | | 180/69.4 |
| 2009/0025690 A1* | 1/2009 | Yamada | | F02M 37/50 |
| | | | | 123/509 |
| 2009/0039011 A1* | 2/2009 | Sato | | F02M 37/50 |
| | | | | 210/491 |
| 2009/0050551 A1* | 2/2009 | Kimisawa | | F02M 37/025 |
| | | | | 210/172.4 |
| 2009/0120858 A1* | 5/2009 | Kojima | | B01D 35/0273 |
| | | | | 210/167.08 |
| 2009/0250410 A1* | 10/2009 | Khalil | | B01D 29/56 |
| | | | | 210/767 |
| 2009/0321347 A1* | 12/2009 | Ogose | | B01D 35/0273 |
| | | | | 210/452 |
| 2010/0072120 A1* | 3/2010 | Sato | | F02M 37/34 |
| | | | | 210/172.4 |
| 2010/0206793 A1* | 8/2010 | Oku | | B01D 29/114 |
| | | | | 210/172.4 |

(56) References Cited

U.S. PATENT DOCUMENTS

| | | | | |
|---|---|---|---|---|
| 2010/0206802 A1* | 8/2010 | Sato | B29C 66/1122 | 210/490 |
| 2010/0294464 A1* | 11/2010 | Graber | B01D 29/114 | 165/104.19 |
| 2010/0307615 A1* | 12/2010 | Takahashi | F02M 37/50 | 137/544 |
| 2011/0132825 A1* | 6/2011 | Nishio | B01D 29/13 | 210/172.4 |
| 2011/0139278 A1* | 6/2011 | Kawajiri | B01D 35/0273 | 137/565.01 |
| 2011/0155658 A1* | 6/2011 | Graber | B01D 39/1623 | 210/243 |
| 2011/0180469 A1* | 7/2011 | Sato | F02M 37/10 | 210/172.4 |
| 2011/0192774 A1* | 8/2011 | Ogose | F02M 37/34 | 210/137 |
| 2011/0192786 A1* | 8/2011 | Nagai | F02M 37/44 | 210/443 |
| 2011/0233122 A1* | 9/2011 | Choi | F02M 37/44 | 210/171 |
| 2012/0175297 A1* | 7/2012 | Schnipke | B01D 35/0273 | 210/484 |
| 2012/0240901 A1* | 9/2012 | Yamada | F02M 37/44 | 123/509 |
| 2012/0248021 A1* | 10/2012 | Schnipke | B01D 35/0273 | 210/232 |
| 2013/0061960 A1* | 3/2013 | Jeon | F02M 37/103 | 137/544 |
| 2013/0098339 A1* | 4/2013 | Yoon | F02M 37/04 | 123/495 |
| 2013/0161249 A1* | 6/2013 | Kwon | B01D 35/0276 | 210/232 |
| 2013/0206663 A1* | 8/2013 | Ito | B01D 35/0273 | 210/172.4 |
| 2013/0233285 A1* | 9/2013 | Yamada | F02M 37/106 | 123/514 |
| 2014/0096849 A1* | 4/2014 | Akagi | B01D 29/11 | 137/545 |
| 2014/0158606 A1* | 6/2014 | Goll | B01D 35/0276 | 210/435 |
| 2014/0202951 A1* | 7/2014 | Graber | B01D 35/005 | 210/489 |
| 2014/0345719 A1* | 11/2014 | Kim | F02M 37/14 | 137/544 |
| 2015/0060349 A1* | 3/2015 | Ishitoya | F02M 37/46 | 210/416.4 |
| 2015/0198071 A1* | 7/2015 | Hudgens | B01D 35/0276 | 210/805 |
| 2016/0108872 A1* | 4/2016 | Akagi | F02M 37/50 | 210/416.4 |
| 2016/0115919 A1* | 4/2016 | Nishio | F02M 37/10 | 210/416.4 |
| 2017/0138323 A1* | 5/2017 | Kobayashi | F02M 37/0076 | |
| 2017/0254303 A1* | 9/2017 | Takahashi | F02M 37/0076 | |
| 2017/0304749 A1* | 10/2017 | Niwa | F02M 37/46 | |
| 2018/0163679 A1* | 6/2018 | Niwa | F02M 37/50 | |
| 2018/0209386 A1* | 7/2018 | Hayashi | B01D 35/02 | |
| 2018/0257006 A1* | 9/2018 | Hayashi | F02M 37/44 | |
| 2018/0347526 A1* | 12/2018 | Ito | F04C 15/06 | |
| 2019/0010905 A1* | 1/2019 | Hayashi | B01D 29/27 | |
| 2019/0022563 A1* | 1/2019 | Kobayashi | B01D 35/0273 | |
| 2019/0063383 A1* | 2/2019 | Kim | F02M 37/14 | |
| 2020/0088145 A1* | 3/2020 | Villaire | F02M 37/10 | |
| 2021/0086114 A1* | 3/2021 | Kim | B01D 35/005 | |

* cited by examiner

STRAINER FOR FUEL PUMP

CROSS-REFERENCE TO RELATED APPLICATIONS

This application claims priority under 35 U.S.C. § 119 to Korean Patent Application No. 10-2019-0118086, filed on Sep. 25, 2019, in the Korean Intellectual Property Office, the disclosure of which is incorporated herein by reference in its entirety.

TECHNICAL FIELD

The following disclosure relates to a strainer for a fuel pump, which is mounted on an inlet of the fuel pump and filters out a foreign material contained in a fuel sucked into the fuel pump.

BACKGROUND

Generally, a device of a vehicle or the like that is driven by receiving a liquid fuel, such as a gasoline engine or diesel engine, includes a fuel tank in which the fuel is stored, and the fuel tank is installed with a fuel pump module configured to be connected to the engine through a fuel supply line to supply the fuel stored in the fuel tank to the engine. Here, in the fuel pump module, a strainer is mounted on a fuel inlet such that the fuel in the fuel tank is primarily filtered and sucked into a fuel pump included in the fuel pump module.

Figure 1:
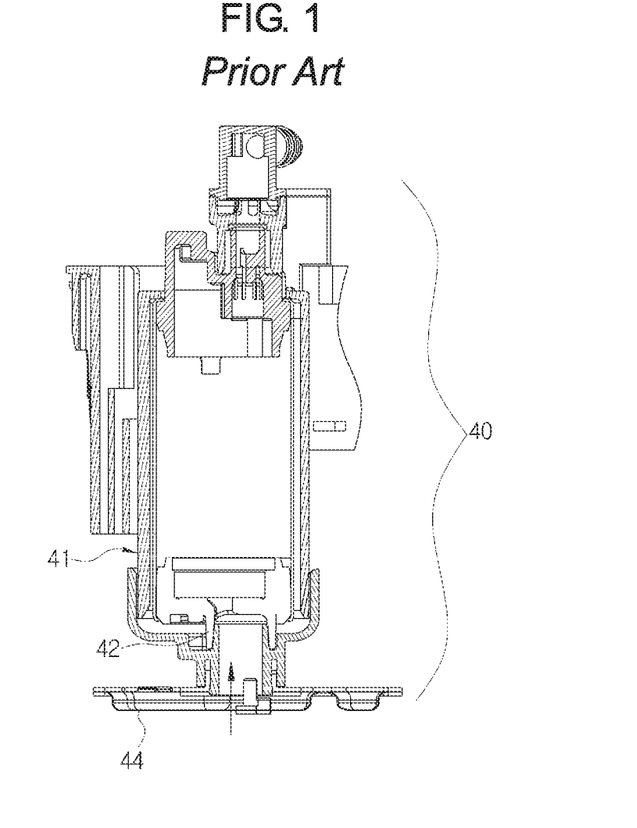
FIG. 1 is a cross-sectional view illustrating a fuel pump on which a strainer according to the related art is mounted.

Such a strainer 44 is coupled to a fuel pump 41 of a fuel pump module 40 mounted in a fuel tank as illustrated in FIG. 1, and is connected to a fuel inlet 42 such that fuel in the fuel tank passes through the strainer 44 to be filtered, and then is introduced into the fuel pump 41. Here, the strainer generally includes a communicating pipe coupled so as to communicate with the fuel inlet of the fuel pump, a filter coupled to the communicating pipe and filtering the fuel, and a rib coupled to the communicating pipe or filter to maintain the shape of the filter.

In order to satisfy the performance of the fuel pump, the strainer needs to have a maximum filtering area to reduce a flow resistance of the fuel. However, in a case where minimization of the fuel pump module is required, since an installation space for the strainer is small, it is necessary to design the strainer to have a space-saving shape.

RELATED ART DOCUMENT

Patent Document (Patent Document 1) KR 10-1075796 B1 (published on Oct. 17, 2011)

SUMMARY

An embodiment of the present invention is directed to providing a strainer for a fuel pump, which has a relatively large filtering area and a small size at the same time.

In one general aspect, a strainer for a fuel pump includes: a communicating pipe including a flow path formed to communicate with a fuel inlet of the fuel pump; a filter including an internal space in which a fuel flows and coupled to the communicating pipe so that the internal space communicates with the communicating pipe; and a rib disposed in the filter and coupled to the communicating pipe, wherein the filter includes a first filtering portion extending in a length direction with respect to the communicating pipe, a connecting portion extending in a width direction at an edge of the first filtering portion, and a second filtering portion extending in the length direction at the connecting portion and spaced apart from the first filtering portion in the width direction.

The filter may be H-shaped.

First bent portions may be formed by bending the first filtering portion so that opposite sides of the first filtering portion in the length direction are directed toward the communicating pipe, a 2-1-th bent portion which is a central portion connected to the connecting portion may be formed by bending the filter at the connecting portion so that the second filtering portion is directed toward the communicating pipe, and 2-2-th bent portions may be formed by bending the second filtering portion at the 2-1-th bent portion so that opposite sides of the second filtering portion in the length direction surround the communicating pipe.

In the filter, the 2-2-th bent portions of the second filtering portion may be arranged between the first bent portions of the first filtering portion in the length direction.

A first coupling portion may be formed on the first bent portion of the first filtering portion, a second coupling portion may be formed on the 2-2-th bent portion of the second filtering portion, and the first coupling portion and the second coupling portion may be coupled to fix the first bent portion of the first filtering portion and the 2-2-th bent portion of the second filtering portion to each other.

The first coupling portion may include an insertion groove having an inner width larger than a width of a slit of a surface of the first coupling portion that faces the second coupling portion, the second coupling portion may include a locking protrusion having a shape corresponding to the insertion groove, and the locking protrusion may be inserted into the insertion groove.

The insertion groove of the first coupling portion may have one end or both ends open, and the locking protrusion of the second coupling portion may be inserted through the open end of the insertion groove.

The rib may be disposed in the first filtering portion, the connecting portion, and the second filtering portion, and the rib may be integrally formed.

The rib may include a first rib disposed in the first filtering portion, the connecting portion, and the second filtering portion of the filter and coupled to the communicating pipe, and a second rib formed to be separate from the first rib and coupled to the filter.

The second rib may include a frame coupled to the filter and exposed to the outside of the filter, and a support protrusion extending from the frame and protruding to the internal space of the filter.

Other features and aspects will be apparent from the following detailed description, the drawings, and the claims.

DETAILED DESCRIPTION OF MAIN ELEMENTS

- 100: Communicating pipe
- 200: Filter
- 201: Upper filter
- 202: Lower filter
- 210: First filtering portion
- 211: First bent portion
- 220: Second filtering portion
- 221: 2-1-th bent portion
- 222: 2-2-th bent portion
- 230: Connecting portion
- 300: Rib
- 301: Frame
- 302: Support protrusion
- 310: First rib
- 311: Frame
- 312: Support protrusion
- 320: Second rib
- 321: Frame
- 322: Support protrusion
- 410: First coupling portion
- 411: Insertion groove
- 420: Second coupling portion
- 421: Locking protrusion
- 1000: Strainer for fuel pump
- 2000: Fuel pump
- 3000: Reservoir

DETAILED DESCRIPTION OF EMBODIMENTS

Hereinafter, a strainer for a fuel pump according to the present invention having the configuration as described above will be described in detail with reference to the accompanying drawings.

First Exemplary Embodiment

Figure 2:
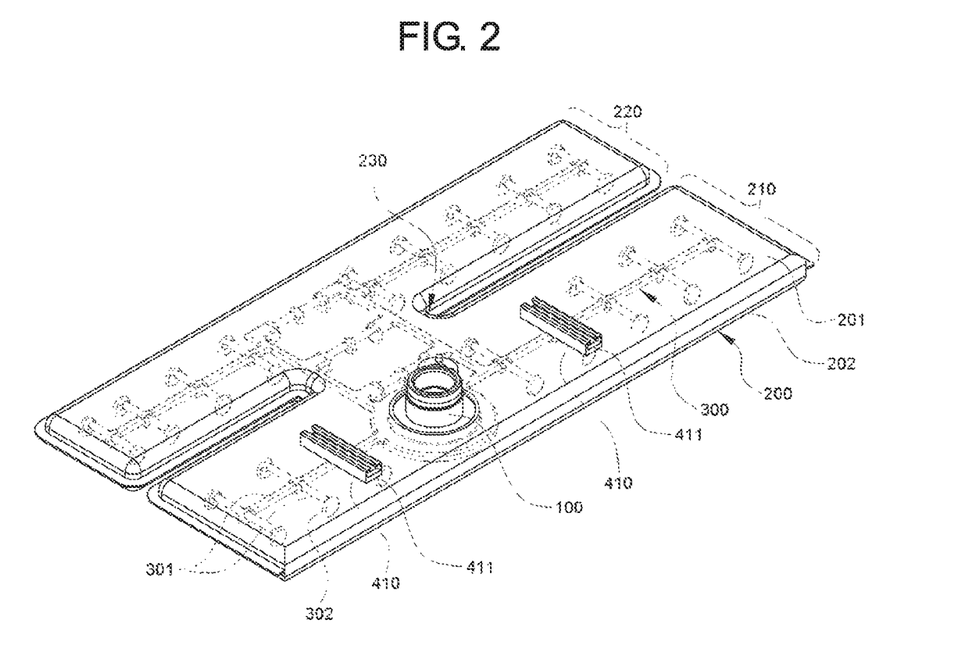
FIGS. 2 and 3 are assembled perspective views each illustrating a state in which a strainer for a fuel pump according to a first exemplary embodiment of the present invention is unfolded.
Figure 3:
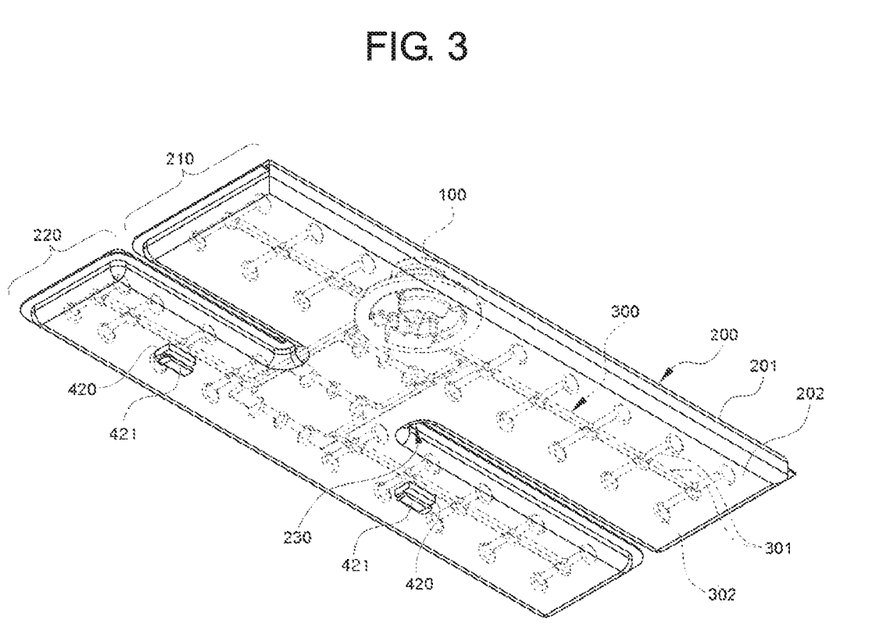

FIGS. 2 and 3 are assembled perspective views each illustrating a state in which a strainer for a fuel pump according to a first exemplary embodiment of the present invention is unfolded.

As illustrated in FIGS. 2 and 3, the strainer for a fuel pump according to the first exemplary embodiment of the present invention may largely include a communicating pipe 100, a filter 200, and a rib 300.

The communicating pipe 100 may include a flow path formed to penetrate through upper and lower surfaces of the communicating pipe 100, and a fuel inlet of a fuel pump may be inserted into the flow path of the communicating pipe 100 to be coupled to and communicate with the communicating pipe 100. Further, the filter 200 may be coupled to a lower side of the communicating pipe 100 so that a part of the lower side of the communicating pipe 100 protrudes in the filter 200. In addition, a coupling portion for coupling the rib 300 may be formed at a lower end portion of the communicating pipe 100 positioned inside the filter 200.

The filter 200 may include an upper filter 201 and a lower filter 202 that are vertically spaced apart from each other so that a space in which a fuel flows is formed in the filter 200. Edges of the upper filter 201 and the lower filter 202 may be bonded to each other by, for example, fusion. The filter 200 may be formed by using, for example, a net formed of a resin material. The filter 200 may be formed by folding in half a sheet of net used to form the filter, and overlapping and bonding the edges of the upper filter and the lower filter. Further, the communicating pipe 100 may be injection-molded in the net used to form the filter so that the communicating pipe 100 and the filter 200 are integrated with each other, and the communicating pipe 100 may be coupled to the upper filter 201. As a result, as a fuel outside the filter 200 passes and is introduced into the filter 200, a foreign material is filtered out, and the fuel flows along a space which is formed in the filter 200 and in which the fuel may flow, such that the fuel may be introduced into the inlet of the fuel pump connected to the communicating pipe 100 through the flow path formed in the communicating pipe 100.

The rib 300 may be disposed in the filter 200. The rib 300 may include a fastening portion and may be coupled and fixed to the coupling portion formed at the lower end portion of the communicating pipe 100. Here, there may be a variety of structures and methods by which the rib 300 and the communicating pipe 100 are coupled to each other. Further, in the rib 300, a skeleton frame 301 may be formed along the space in the filter 200, and a plurality of support protrusions 302 may protrude from the frame 301.

As a result, the upper filter 201 and the lower filter 202 may be maintained to be spaced apart from each other without coming into contact with each other even when the upper filter 201 and the lower filter 202 are pressed toward each other due to a fuel pressure or external force. Therefore, it is possible to prevent the space in which the fuel flows in the filter 200 from being blocked. Further, the rib 300 may be formed of a flexible material that is bendable, and may be formed of a material having plasticity enough to maintain a deformed shape of the rib 300 to some degree after bending the rib 300.

Here, the filter 200 may include a first filtering portion 210 extending in a length direction with respect to the communicating pipe 100, a connecting portion 230 extending in a width direction at an edge of the first filtering portion 210 in the width direction, and a second filtering portion 220 extending in the length direction at the connecting portion 230 and spaced apart from the first filtering portion 210 in the width direction.

In other words, the filter 200 is H-shapes as illustrated, and a portion extending toward opposite outer sides in the length direction with respect to the communicating pipe 100 and including a portion to which the communicating pipe 100 is coupled may serve as the first filtering portion 210.

Further, a portion extending in the width direction at the edge of the first filtering portion 210 in the width direction may serve as the connecting portion 230. A portion that extends toward opposite outer sides in the length direction at the connecting portion 230, is aligned with the first filtering portion 210, and is spaced apart from the first filtering portion 210 in the width direction may serve as the second filtering portion 220. Here, the first filtering portion 210, the connecting portion 230, and the second filtering portion 220 may be formed so that internal spaces are connected to and communicate with one another, and the integrally formed rib 300 may be disposed in the first filtering portion 210, the connecting portion 230, and the second filtering portion 220. In addition, the filter 200 may have various shapes such as an "H"-letter shape with a missing part, and a shape in which the connecting portions 230 extend from opposite sides of the first filtering portion 210 in the width direction, and the second filtering portions 220 extend from the connecting portions 230, respectively, in the length direction so that the second filtering portions 220 are formed on the opposite sides of the first filtering portions 210 in the width direction.

Figure 4:
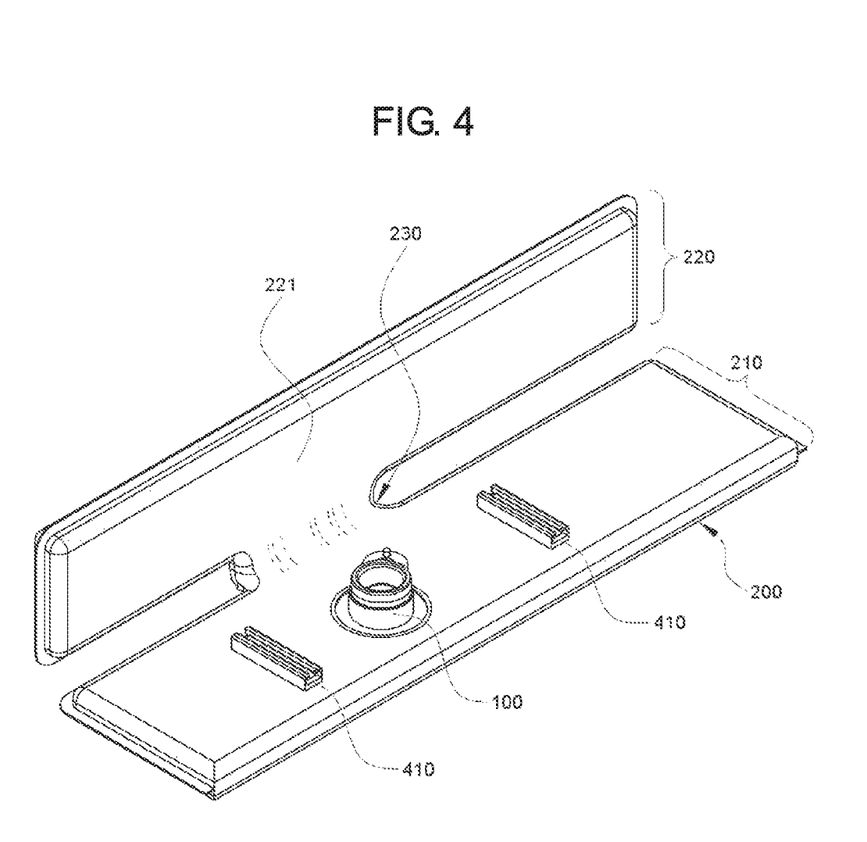
FIG. 4 is a perspective view illustrating a state in which a filter is bent at a connecting portion so that a second filtering portion is directed upward, in the strainer for a fuel pump of FIG. 2.
Figure 5:
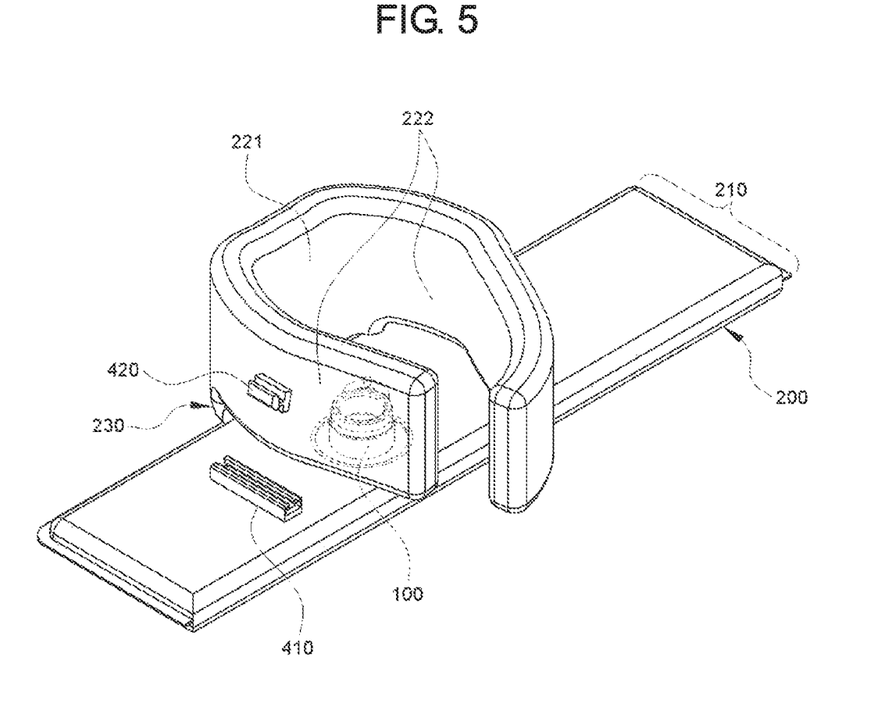
FIG. 5 is a perspective view illustrating a state in which the second filtering portion is rolled and bent at a central portion connected to the connecting portion so that opposite sides in a length direction are directed toward a communicating pipe, in the strainer for a fuel pump of FIG. 4.
Figure 6:
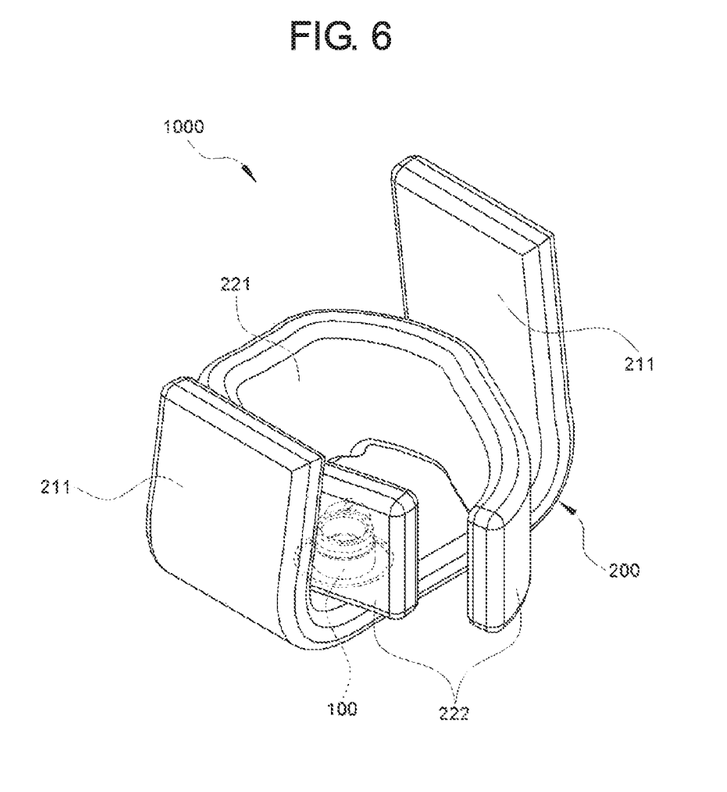
FIG. 6 is a perspective view illustrating a state in which a first filtering portion is bent so that opposite sides in the length direction are directed upward, in the strainer for a fuel pump of FIG. 5.

FIG. 4 is a perspective view illustrating a state in which the filter is bent at the connecting portion so that the second filtering portion is directed upward, in the strainer for a fuel pump of FIG. 2, FIG. 5 is a perspective view illustrating a state in which the second filtering portion is rolled and bent at a central portion connected to the connecting portion so that opposite sides in the length direction are directed toward the communicating pipe, in the strainer for a fuel pump of FIG. 4, and FIG. 6 is a perspective view illustrating a state in which the first filtering portion is bent so that opposite sides in the length direction are directed upward, in the strainer for a fuel pump of FIG. 5.

As illustrated in FIG. 4, a 2-1-th bent portion 221 may be formed by bending the filter 200 at the connecting portion 230 so that the second filtering portion 220 is directed upward (that is, toward the communicating pipe 100), and as illustrated in FIG. 5, 2-2-th bent portions 222 may be formed by bending the second filtering portion 220 at the 2-1-th bent portion 221, which is the central portion in the length direction and is connected to the connecting portion 230, so that opposite sides of the second filtering portion 220 in the length direction surround the communicating pipe 100. In addition, as illustrated in FIG. 6, first bent portions 211 may be formed by bending the first filtering portion 210 so that opposite sides of the first filtering portion 210 in the length direction with respect to the communicating pipe 100 are directed upward (that is, toward the communicating pipe 100). As a result, the 2-2-th bent portions 222 of the second filtering portion 220 may be arranged between the first bent portions 211 in the length direction. In addition to the above-described arrangement, the first bent portions 211 of the first filtering portion 210 and the 2-1-th bent portion 221 and the 2-2-th bent portions 222 of the second filtering portion 220 may be arranged in various manners.

Figure 7:
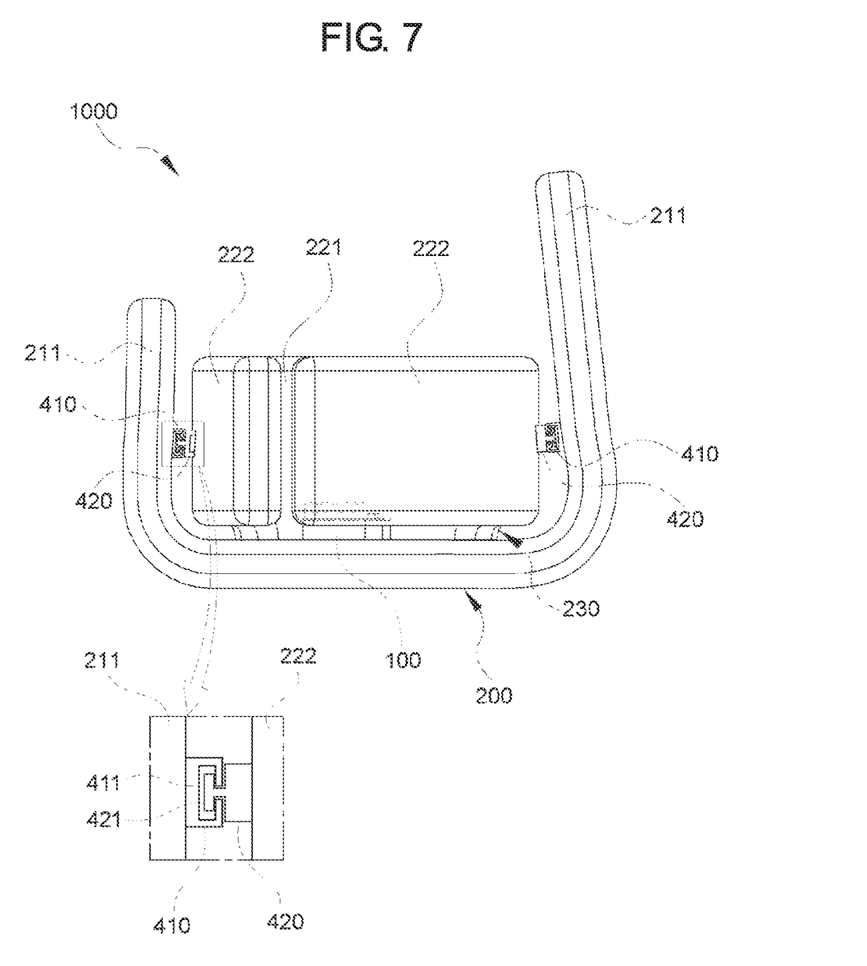
FIG. 7 is a front view illustrating a structure in which the first filtering portion and the second filtering portion are bent and are coupled and fixed to each other at portions disposed close to each other in the strainer for a fuel pump according to the first exemplary embodiment of the present invention.

FIG. 7 is a front view illustrating a structure in which the first filtering portion and the second filtering portion are bent and are coupled and fixed to each other at portions disposed close to each other in the strainer for a fuel pump according to the first exemplary embodiment of the present invention.

As illustrated in FIG. 7, the strainer 1000 for a fuel pump according to the first exemplary embodiment of the present invention may further include a first coupling portion 410 and a second coupling portion 420. Here, the first coupling portion 410 may be formed on the first bent portion 211 of the first filtering portion 210, and the second coupling portion 420 may be formed on the 2-2-th bent portion 222 of the second filtering portion 220. Here, the first coupling portion 410 and the second coupling portion 420 may be formed on surfaces of the first bent portion 211 and the 2-2-th bent portion 222 that face each other, respectively, and the first coupling portion 410 and the second coupling portion 420 may be integrally coupled to the filter 200. Accordingly, as the first coupling portion 410 and the second coupling portion 420 are coupled to each other, the first bent portion 211 and the 2-2-th bent portion 222 may be fixed to each other.

Further, a concave insertion groove 411 may be formed in the first coupling portion 410 along the width direction. The insertion groove 411 may have an inner width larger than a width of a slit formed in a surface of the first coupling portion 410 that faces the second coupling portion 420, and the insertion groove 411 may have one end or both ends open in the width direction. Further, the second coupling portion 420 may include a locking protrusion 421 having a shape corresponding to the insertion groove 411 of the first coupling portion 410, and the locking protrusion 421 may be inserted into the insertion groove 411 for the coupling. Here, the locking protrusion 421 of the second coupling portion 420 may be inserted along the insertion groove 411 of the first coupling portion 410 in the width direction, and may be prevented from coming out of the insertion groove 411 in the length direction after being inserted into the insertion groove 411 of the first coupling portion 410.

Second Exemplary Embodiment

Figure 8:
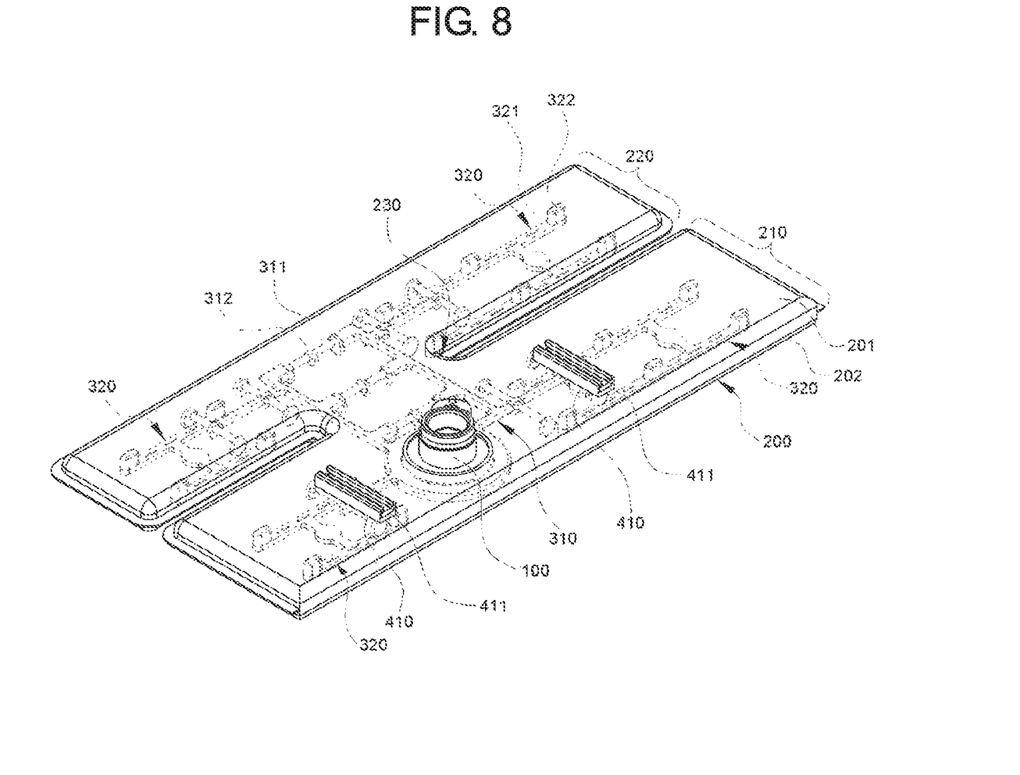
FIGS. 8 and 9 are assembled perspective views each illustrating a state in which a strainer for a fuel pump according to a second exemplary embodiment of the present invention is unfolded.
Figure 9:
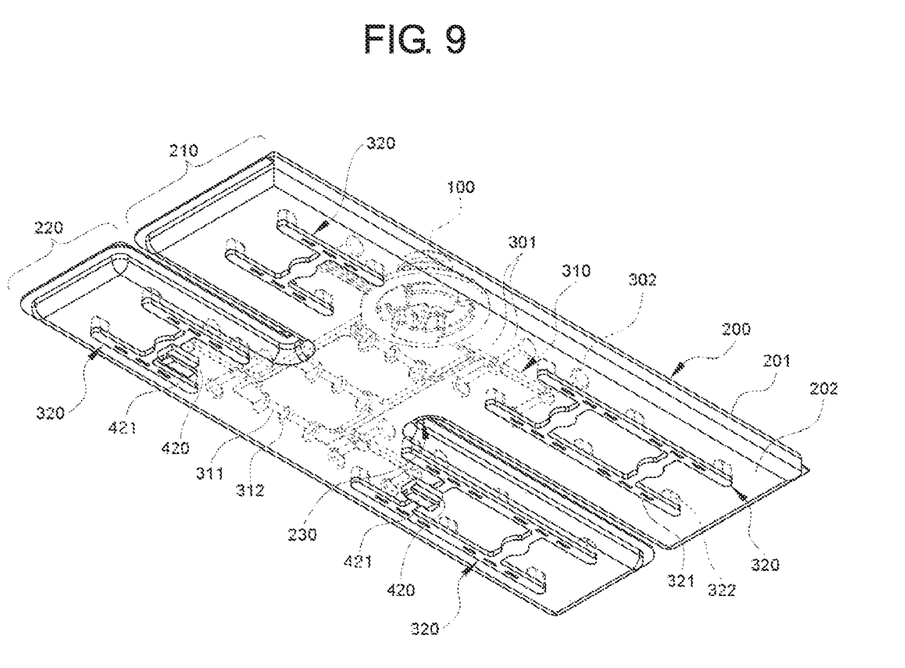

FIGS. 8 and 9 are assembled perspective views each illustrating a strainer for a fuel pump according to a second exemplary embodiment of the present invention is unfolded.

As illustrated in FIGS. 8 and 9, the strainer for a fuel pump according to the second exemplary embodiment of the present invention may largely include a communicating pipe 100, a filter 200, and a rib 300, similarly to the first exemplary embodiment. The communicating pipe 100 and the filter 200 may have the same configuration as the first exemplary embodiment. The rib 300 may include a first rib 310 and a second rib 320, in which the first rib 310 may be coupled to the communicating pipe 100, and the second rib 320 may be formed to be separate from the first rib 310 and coupled to the filter 200. That is, the first rib 310 may be disposed in a first filtering portion 210, a connecting portion 230, and a second filtering portion 220, but a length of a frame 311 extending in a length direction may be shorter than that in the first exemplary embodiment, such that the first rib 310 is not disposed at opposite ends of the first filtering portion 210 in the length direction and opposite ends of the second filtering portion 220 in the length direction. Support protrusions 312 protruding from the frame 311 may have the same configuration as the first exemplary embodiment. The second ribs 320 may be disposed in a portion where the first rib 310 is not disposed. In the second rib 320, a frame 321 may be coupled to an outer portion of the filter 200 and thus exposed to the outside of the filter 200, and support protrusions 322 may protrude in the inside of the filter 200. Here, the second rib 320 may be formed by injection-molding so as to be integrally bonded to the filter 200. Alternatively, the second ribs 320 may be formed to be separate from the first rib 310, and assembled and coupled to the first rib 310, and the second rib 320 may also be disposed in the filter 200. As a result, it is possible to manufacture various types of strainers for a fuel pump by using the same first rib 310 and changing the number of the second ribs 320 or the shape of the second rib 320 depending on the shape of the filter 200.

Similarly to the first exemplary embodiment, in the strainer for a fuel pump according to the second exemplary embodiment of the present invention, the first filtering portion 210 and the second filtering portion 220 may have a bent shape, and a first coupling portion 410 and a second coupling portion 420 may be formed to couple and fix bent portions of the filter 200 to each other.

Figure 10:
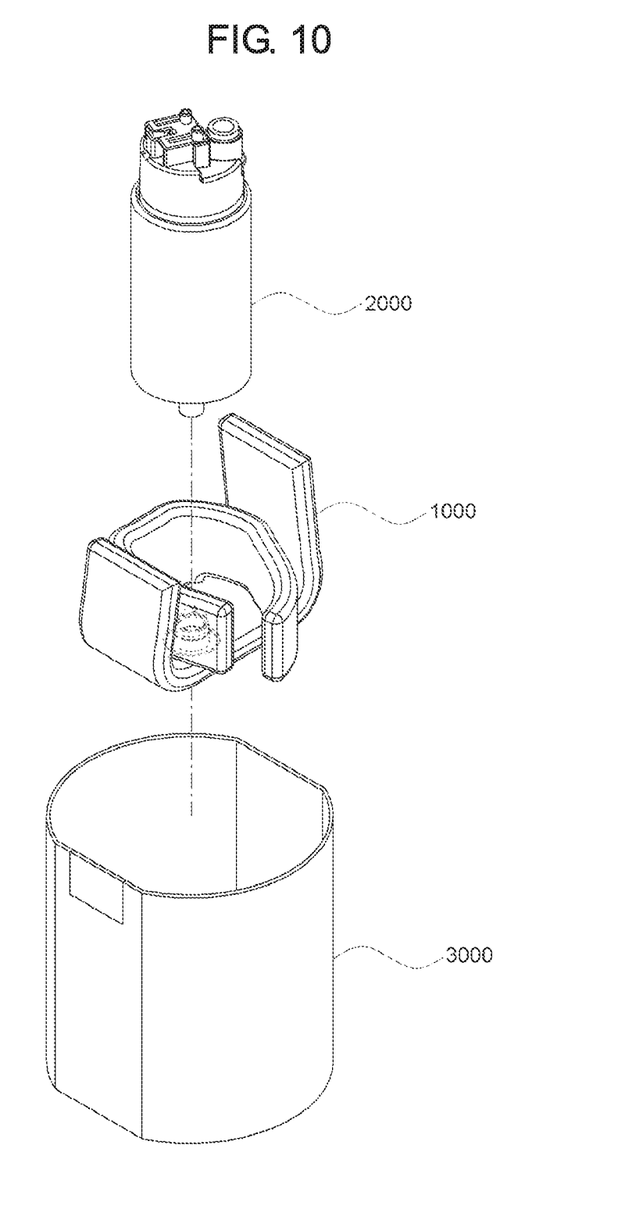
FIGS. 10 and 11 are an exploded perspective view and an assembled perspective view each illustrating a fuel pump module having a structure in which the strainer for a fuel pump according to the present invention is coupled to a fuel pump and housed in a reservoir.
Figure 11:
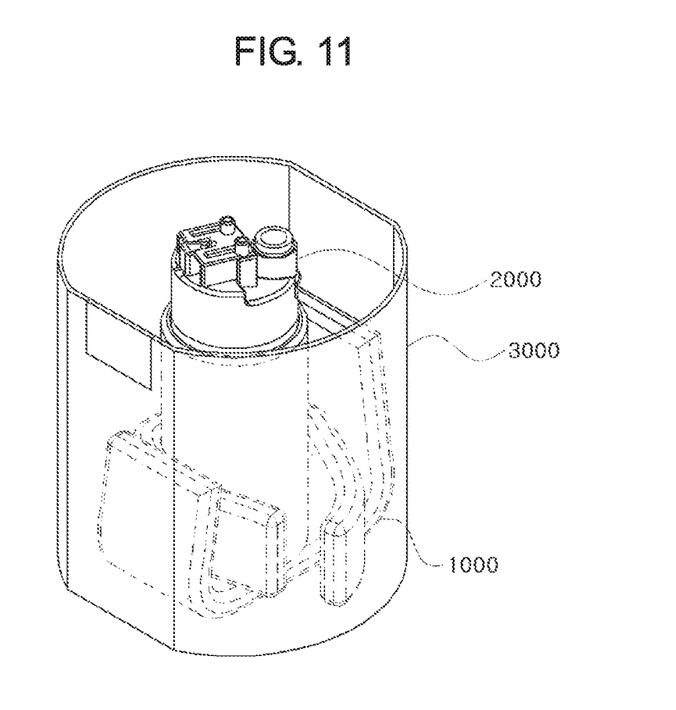

FIGS. 10 and 11 are an exploded perspective view and an assembled perspective view each illustrating a fuel pump module having a structure in which the strainer for a fuel pump according to the present invention is coupled to a fuel pump and housed in a reservoir.

As illustrated in FIGS. 10 and 11, the communicating pipe of the strainer 1000 for a fuel pump is fitted and coupled to a fuel inlet formed at a lower end of a fuel pump 2000, and then the strainer 1000 for a fuel pump and the fuel pump 2000 are inserted into a reservoir 3000, thereby forming the fuel pump module.

As such, the strainer 1000 for a fuel pump according to the present invention may have a relatively large filtering area and a small size at the same time. Therefore, designing and installation of the strainer for a fuel pump may be easy even in a case where a size of a reservoir included in a fuel pump module is small.

The present invention is not limited to the abovementioned exemplary embodiments, but may be variously applied. In addition, the present invention may be variously modified by those skilled in the art to which the present invention pertains without departing from the gist of the present invention claimed in the claims.

What is claimed is:

1. A filter assembly for a fuel pump, the filter assembly comprising:
    an H-shaped filter material element including:
        a first elongate filter portion defining a first internal filtrate space;
        a second elongate filter portion defining a second internal filtrate space and being spaced from said first elongate filter portion and being oriented substantially parallel thereto; and
        a connecting filter portion defining a third internal filtrate space, said connecting filter portion being connected to said first and second portions at points intermediate to elongate ends of said first and second portions to form said H-shape, said third internal filtrate space placing said first and second internal filtrate spaces in fluid communication with each other, wherein, each of said first, second and connecting filter portions are bendable;
    a communicating pipe extending through a wall of said first elongate filter portion and defining a flow path capable of placing said first internal filtrate space in fluid communication with an inlet of a fuel pump; and
    a rib disposed within at least said first internal filtrate space and coupled to said communicating pipe.

2. The filter assembly of claim 1, wherein said connecting filter portion is upwardly bent in the same direction that said communicating pipe extends through said wall of said first elongate filter portion.

3. The filter assembly of claim 2, wherein said ends of said second elongate filter portion are bent to encircle a region above and/or around said communicating pipe.

4. The filter assembly of claim 3, wherein said ends of said first elongate filter portion are upwardly bent about said encircling second elongate filter portion on either side of said communicating pipe.

5. The filter assembly of claim 4, wherein a first coupling portion is formed on said first elongate filtering portion filtering portion.

6. The filter assembly of claim 5, wherein a second coupling portion is formed on said second elongate filtering portion filtering portion.

7. The filter assembly of claim 6, wherein said first coupling portion and said second coupling portion are coupled to each other to fix said first and second elongate filtering portions.

8. The filter assembly of claim 6, wherein said first coupling portion includes an insertion groove having an inner width larger than a width of a slit of a surface of the first coupling portion that faces the second coupling portion, the second coupling portion includes a locking protrusion having a shape corresponding to the insertion groove, and the locking protrusion is inserted into the insertion groove.

9. The filter assembly of claim 8, wherein the insertion groove of the first coupling portion has at least one end or both ends open, and the locking protrusion of the second coupling portion is inserted through the open end of the insertion groove.

10. The filter assembly of claim 1, wherein said rib is additionally disposed within said second and third internal filtrate spaces.

11. The filter assembly of claim 10, wherein said rib is integrally formed.

12. The filter assembly of claim 1, wherein said rib is additionally disposed within said second and third internal filtrate spaces, and a second rib is formed which is separate from the first rib and coupled to the filter material.

13. The filter assembly of claim 12, wherein the second rib includes a frame external of, and coupled to the filter material, and a support protrusion extending from the frame and protruding through the filter material.

* * * * *